(12) United States Patent
Nakahata et al.

(10) Patent No.: US 6,333,282 B1
(45) Date of Patent: Dec. 25, 2001

(54) OPTICAL GLASS FOR PRECISION MOLDING

(75) Inventors: Koji Nakahata; Koichi Tsuchiya; Shinobu Nagahama, all of Saitama-ken (JP)

(73) Assignee: Sumita Optical Glass, Inc., Saitama-Ken (JP)

( * ) Notice: Subject to any disclaimer, the term of this patent is extended or adjusted under 35 U.S.C. 154(b) by 0 days.

(21) Appl. No.: 09/635,265

(22) Filed: Aug. 9, 2000

(30) Foreign Application Priority Data

Aug. 20, 1999 (JP) .................................................. 11-233989

(51) Int. Cl.[7] .............................. C03C 3/14; C03C 3/16; C03C 3/19; C03C 3/21
(52) U.S. Cl. ................................. 501/45; 501/42; 501/46; 501/47; 501/49; 501/901
(58) Field of Search .................... 501/42, 45, 46, 501/47, 49, 900, 901

(56) References Cited

U.S. PATENT DOCUMENTS

| | | | |
|---|---|---|---|
| 4,115,131 | * | 9/1978 | Ishibashi et al. . |
| 4,193,807 | * | 3/1980 | Ishibashi et al. . |
| 4,996,173 | * | 2/1991 | Tachiwana .......................... 501/73 |

FOREIGN PATENT DOCUMENTS

| | | | |
|---|---|---|---|
| 61040839-A | * | 2/1986 | (JP) . |
| A-1-308843 | | 12/1989 | (JP) . |
| A-7-247135 | | 9/1995 | (JP) . |
| A-7-247136 | | 9/1995 | (JP) . |
| A-8-157231 | | 6/1996 | (JP) . |
| A-10-316448 | | 12/1998 | (JP) . |

* cited by examiner

Primary Examiner—David R. Sample
(74) Attorney, Agent, or Firm—McDermott, Will & Emery

(57) ABSTRACT

The present invention provides an optical glass for precision molding, having excellent properties, i.e. yield temperature (At) of at most 550° C., refractive index (nd) of at least 1.83 and Abbe number (vd) of at most 26.0 and further providing a low softening property as well as an improved mass production property with less coloration, which is represented, in term of atoms for making up the glass, by the following chemical composition (wt %)

| | |
|---|---|
| $P_2O_5$ | 14.0 to 31.0% |
| $B_2O_3$ | 0 to 5.0% |
| $GeO_2$ | 0 to 14.0% |
| Sum of $P_2O_5 + B_2O_3 + GeO_2$ | 14.0 to 35.0% |
| $Li_2O$ | 0 to 6.0% |
| $Na_2O$ | 2.5 to 14.0% |
| Sum of $Li_2O + Na_2O$ | 2.5 to 15.0% |
| $Nb_2O_5$ | 22.0 to 50.0% |
| $WO_3$ | 0 to 30.0% |
| $Bi_2O_3$ | 5.0 to 36.0% |
| $BaO$ | 0 to 22.0%. |

2 Claims, 1 Drawing Sheet

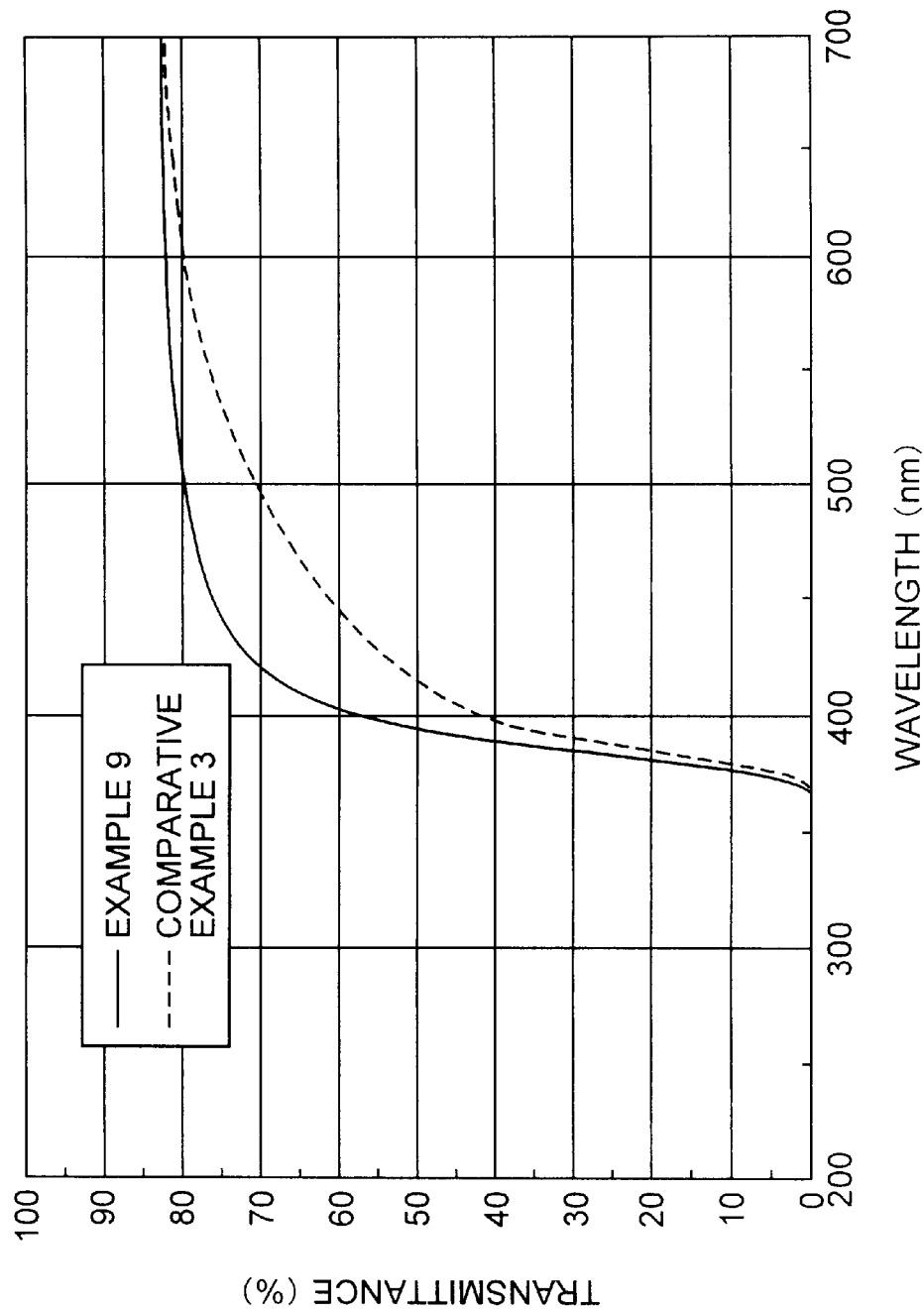

OPTICAL GLASS FOR PRECISION MOLDING

BACKGROUND OF THE INVENTION

1. Field of the Invention

This invention relates to an optical glass for precision molding, capable of carrying out a precision molding at a low temperature and needing no polishing and grinding after the precision molding.

2. Description of the Prior Art

Since the prior art optical glass of SF type (high referactive index, high dispersion) containing a large amount of lead oxide in the glass composition is very stable and has a relatively low softening point, the precision molding thereof is carried out at a low temperature zone. JP-A-1-308843 discloses a glass composition rendered feasible at a further low temperature as an optical glass for precision molding. JP-A-7-247135 and JP-A-7-247136 disclose glasses of $P_2O_5$—PbO—$Nb_2O_5$—$WO_3$-alkali metal oxide type each containing a large amount of lead oxide and JP-A-8-157231 discloses $P_2O_5$—$B_2O_3$—$Nb_2O_5$—$WO_3$-alkali metal oxide type.

However, the precision molding is generally carried out in a reducing atmosphere so as to prevent a mold from oxidation, so if lead oxide is contained in the glass composition, the lead oxide on the glass surface is reduce and deposited as lead on the surface of a precision molding lens. The lead is evaporated by heating for the precision molding, a part of which adheres to the surface of the mold material to form a convex part which is then transferred to the surface of the precision molding lens as it is. When such step. are continuously repeated, the surface accuracy of the precision molding lens cannot be maintained, so that not only such optical properties as designed can not be obtained, but also an operation for removing the lead adhered to the mold is required. This is not suitable for mass production of the lenses. Furthermore, because of containing lead oxide in large amounts, the specific gravity is increased and thus, there arises another problem that weight-lightening of an optical part is difficult in which these lenses are incorporated. Accordingly, the glasses disclosed in the foregoing JP-A-1-308843, JP-A-7-247135 and JP-A-7-247136 are not suitable, nor practically used as an optical glass for precision molding.

On the other hand, in a glass described in JP-A-8-157231, surely, lead oxide is not incorporated, but in place of the lead oxide, $TiO_2$ is all incorporated, although claimed as an optional component, in order to obtain high refractive index, high dispersion properties as shown in Examples 7 to 11 of the second embodiment of the present invention. Consequently, the resulting glass is very strongly colored. In the ordinary optical systems, use of a single glass lens is not realistic and many optical systems are substantially composed of a number of lenses. Thus, it is desired that coloration of these glass lenses is rendered as little as possible. Accordingly, the glass described in JP-A-8-157231 is substantially caused to have high refractive index, high dispersion properties by $TiO_2$, which cannot be said to be preferable from the standpoint of optical designing.

In the case of known mold materials for precision molding, there arises a problem that the higher is the precision molding temperature, the more is oxidation or deterioration of the mold material, thus resulting in difficulty in maintenance of the surface accuracy of the mold material and in mass production of lenses by the precision molding. On the other hand, the precision molding is generally carried out at a temperature of higher by 15 to 50° C. than the yield temperature (At) of the glass. That is, an optical glass to be subjected to precision molding must be precision molded at a temperature of as lower as possible and to this end, it is desired that the yield temperature (At) measured by TMA of the glass is as lower as possible In the foregoing JP-A-8-157231, however, there are no examples concerning a glass having a high refractive index, high dispersion properties (refractive index (nd) at least 1.83, Abbe number (vd) at most 26.0) and low softening property (yield temperature (At) at most 550° C.). In this specification, the yield temperature is defined based on the measurement by TMA.

Moreover, the inventors have developed an invention relating to a new optical glass in JP-A-10-316448. In the optical glass of $P_2O_5$—$Nb_2O_5$—$TeO_2$-alkali metal oxide type, described in JP-A-10-316448, our expected objects can substantially be achieved, but in view of influences upon the ambient environment or the human body by $TeO_2$ contained in a glass composition, it is concluded that further improvements are required.

SUMMARY OF THE INVENTION

It is an object of the present invention to provide an optical glass for precision molding, capable of carrying out a precision molding at a low temperature, without needing polishing and grinding after the precision molding, whereby the above described problems of the prior art can be solved.

It is another object of the present invention to provide a high refractive index, high dispersion optical glass for precision molding, having excellent properties, i.e. refractive index (nd) of at least 1.83, Abbe number (vd) of at most 26.0 and effect of readily lowering the softening point of the glass such as by lead oxide or tellurium oxide, and further providing a low softening property shown by a yield temperature (At) of at most 550° C. as well as an improved mass production property without being colored.

These objects can be attained by an optical glass for precision molding, in which $P_2O_5$, $Nb_2O_5$, $Bi_2O_3$ and $Na_2O$ are defined in the specified ranges.

BRIEF DESCRIPTION OF THE DRAWING

FIG. 1 is a graph showing a relationship between the wavelength (nm) and transmittance (%) for comparison of the coloration (transmittance) of optical glasses of Example 9 according to the present invention and Comparative Example 3.

DETAILED DESCRIPTION OF THE INVENTION

That is, according to the present invention, there is provided a high refractive index, high dispersion optical glass for precision molding, having excellent properties, i.e. refractive index (nd) of at least 1.83, preferably 1.835 to 1.900, Abbe number (vd) of at most 26.0, preferably 25.0 to 21.0 and further providing a low softening property shown by a yield temperature (At) of at most 550° C., preferably at most 540° C. as well as an improved mass production property without being colored.

Specifically, the present invention relates to a high refractive index, high dispersion optical glass for precision molding, which is represented, in term of atoms for making up the glass, by the following chemical composition (wt %):

|   | Preferred Range |   |
|---|---|---|
| $P_2O_5$ | 14.0 to 31.0% | 15.0 to 30.0% |
| $B_2O_3$ | 0 to 5.0% | 0 to 4.0% |
| $GeO_2$ | 0 to 14.0% | 0 to 12.0% |
| Sum of $P_2O_5 + B_2O_3 + GeO_2$ | 14.0 to 35.0% | 17.0 to 30.0% |
| $Li_2O$ | 0 to 6.0% | 0 to 5.0% |
| $Na_2O$ | 2.5 to 14.0% | 5.0 to 13.0% |
| Sum of $Li_2O + Na_2O$ | 2.5 to 15.0% | 5.0 to 14.0% |
| $Nb_2O_5$ | 22.0 to 50.0% | 25.0 to 45.0% |
| $WO_3$ | 0 to 30.0% | 0 to 20.0% |
| $Bi_2O_3$ | 5.0 to 36.0% | 6.0 to 30.0% |
| BaO | 0 to 22.0% | 0 to 15.0% |

The reasons for limiting the composition range (% should be taken as those by weight unless otherwise indicated) of each component of this optical glass according to the present invention are as follows:

$P_2O_5$ is an essential component for the optical glass according to the present invention and a main component for composing a network structure of the glass, which is present in a proportion of 14.0 to 31.0%, since if more than 31%, the yield temperature (At) rises, while if less than 14%, the devitrification tendency is increased to render the glass unstable. The preferred range is 15.0 to 30.0%.

$B_2O_3$ is an optional component but an effective component for composing a network structure similar to $P_2O_5$ and rendering uniform the glass using in a suitable amount, which is present in a proportion of 0 to 5.0%, since if more than 5.0%, the aimed low yield temperature (At) and high refractive index, high dispersion properties cannot be maintained. The preferred range is 0 to 4.0%.

$GeO_2$ is an optional, but very effective component for composing a network structure similar to $P_2O_5$ and increasing the refractive index of the glass. If the amount of $GeO_2$ exceeds 14%, the yield temperature (At) is increased. Because of the expensive raw material, use of this material in a large amount is not so realistic for the mass production. Accordingly, the content of $GeO_2$ is in a range of 0 to 14.0%, preferably 0 to 12.0%.

When the sum of $P_2O_5+B_2O_3+GeO_2$ exceeds 35%, the previously aimed refractive index and yield temperature (At) are hard to obtain and when less than 14%, the glass becomes unstable. Accordingly, the sum of $P_2O_5+B_2O_3+GeO_2$ should be in a range of 14.0 to 35.0%, preferably 17.0 to 30.0%.

$Li_2O$ is an optional, but very effective component for lowering the softening point of the glass in the similar manner to $Na_2O$. If using $Li_2O$ in a suitable amount with $Na_2O$, a previously aimed low yield temperature (At) can be obtained. If exceeding 6%, however, the coefficient of thermal expansion of the glass is increased and correct transferring of a lens surface during precision molding is difficult, while the water resisting property is also deteriorated. Accordingly, the content of $Li_2O$ is in a range of 0 to 6.0%, preferably 0 to 5.0%.

$Na_2O$ is an essential component for the optical glass according to the present invention and a very important component for largely contributing to the low softening and stability of the glass. If less than 2.5%, its effects are decreased, while if exceeding 14%, the water resisting property of the glass is deteriorated. Accordingly, the content of $Na_2O$ should be 2.5 to 14.0%, preferably 5.0 to 13.0%.

When the sum of $Li_2O$ and $Na_2O$ exceeds 15%, the glass tends to be unstable and the water resisting property of the glass is deteriorated. If less than 2.5%, the aimed low yield temperature (At) cannot be obtained. Accordingly, the sum of $Li_2O$ and $Na_2O$ should be in a range of 2.5 to 15.0%, preferably, 5.0 to 14.0%.

$Nb_2O_5$ is an essential component for the optical glass according to the present invention and a very effective component for attaining the aimed high refractive index, high dispersion. If less than 22%, however, the effect is decreased, while if exceeding 50%, the melting property is markedly deteriorated and the glass is very unstable. Accordingly, the content of $Nb_2O_5$ should be in a range of 22.0 to 50.0%, preferably 25.0 to 45.0%.

$WO_3$ is an optional component but an effective component for attaining the aimed high refractive index, high dispersion properties according to the present invention, similar to $Nb_2O_5$, and for controlling the refractive index without raising the yield temperature (At) by using in a suitable amount with $Nb_2O_5$. If exceeding 30%, however, the water resisting property of the glass is deteriorated and the specific gravity of the glass tends to be increased. Accordingly, the content of $WO_3$ should be in a range of 0 to 30.0%, preferably 0 to 20.0%.

$Bi_2O_3$ is an essential component for the optical glass according to the present invention and a very important component for lowering the yield temperature (At) in the similar manner to alkali metal oxides as well as raising the refractive index of the glass in the similar manner to $Nb_2O_5$, $WO_3$, etc. If less than 5%, however, the effect is decreased, while if exceeding 36%, the specific gravity of the glass tends to be increased and a noble metal of a melting container tends to be attacked thereby to color the glass. Accordingly, the content of $Bi_2O_3$ should be in a range of 5.0 to 36.0%, preferably 6.0 to 30.0%.

BaO is an optional component but an effective component for controlling the refractive index. If exceeding 22%, the high refractive index is hard to maintain and the glass is unstable. Accordingly, the content of BaO should be in a range of 0 to 22.0%, preferably 0 to 15.0%.

In the optical glass of the present invention, in addition to the above described components, $ZrO_2$, $Ta_2O_5$, $Ga_2O_3$, $K_2O$, MgO, ZnO, CaO, SrO, etc. can be incorporated for the purpose of controlling the optical constants, improving the melting property and increasing the stability of the glass without departure from the scope of the present invention.

Production of the optical glass according to the present invention is carried out by weighing and mixing the corresponding raw material compounds so that a predetermined proportion of the object composition is given, for example, oxides, hydroxides, carbonates, nitrates and phosphates, adequately blending these materials, charging the resulting mixture in a platinum crucible melting in an electric furnace at a temperature of 900 to 1200° C. with suitable agitation to render homogeneous, cleaning and casting the mixture in a preheated metallic mold at a suitable temperature and then gradually cooling. A small amount of a defoaming agent such as $Sb_2O_3$, etc. can further be added.

The following examples are given in order to illustrate the present invention in detail without limiting the same.

EXAMPLES 1 to 15

Examples of compositions (weight %) of the optical glass according to the present invention and their characteristic values of refractive index (nd), Abbe number (vd) and yield temperature (At) are shown in Table 1. The yield temperature (At) was measured by the use of a thermomechanical analyzer in the case of raising the temperature at 5° C. per minute.

Optical glasses of this Example were prepared by using the corresponding oxides, hydroxides, carbonates, nitrates and phosphates as raw materials for each component, weighing these materials to give proportions of compositions as shown in Table 1, adequately mixing, then charging in a platinum crucible, melting in an electric furnace at 900 to 1200° C., stirring the mixture at a suitable time to render homogeneous, cleaning, then casting in a metallic mold preheated at a suitable temperature and gradually cooling to prepare an optical glass of each Example.

Then, a glass block with a predetermined weight was cut out of the resulting glass, polished in a columnar shape in conventional manner and subjected, as a preform, to precision molding to obtain several lens articles. These lenses exhibited good transferring property and there was found no adhesion of the glass and evaporated matters to a mold material.

TABLE 1

(wt %)

| Composition | Example No. | | | | |
|---|---|---|---|---|---|
| | 1 | 2 | 3 | 4 | 5 |
| $P_2O_5$ | 28.7 | 28.5 | 23.2 | 28.3 | 29.0 |
| $B_2O_3$ | — | 1.0 | 1.1 | 1.0 | — |
| $GeO_2$ | — | — | 6.5 | — | 1.2 |
| $Li_2O$ | 3.8 | 3.0 | 4.0 | 5.8 | 3.6 |
| $Na_2O$ | 5.0 | 6.2 | 6.7 | 2.9 | 5.2 |
| BaO | — | — | — | — | — |
| $Nb_2O_5$ | 27.7 | 35.0 | 47.8 | 28.5 | 34.4 |
| $WO_3$ | — | — | — | — | — |
| $Bi_2O_3$ | 34.8 | 26.3 | 9.5 | 33.5 | 26.6 |
| | | | SrO 1.2 | | |
| Characteristic Values | | | | | |
| nd | 1.83960 | 1.83757 | 1.85536 | 1.83679 | 1.83715 |
| νd | 24.6 | 24.1 | 23.3 | 24.9 | 24.3 |
| At/° C. | 473 | 514 | 544 | 468 | 500 |

| Composition | Example No. | | | | |
|---|---|---|---|---|---|
| | 6 | 7 | 8 | 9 | 10 |
| $P_2O_5$ | 23.2 | 17.5 | 23.4 | 17.0 | 24.9 |
| $B_2O_3$ | — | — | 2.0 | 4.0 | 1.1 |
| $GeO_2$ | — | 13.5 | — | 7.0 | — |
| $Li_2O$ | — | 2.7 | 3.1 | 3.0 | 3.5 |
| $Na_2O$ | 13.5 | 7.3 | 8.2 | 7.0 | 5.2 |
| BaO | — | — | — | 2.0 | — |
| $Nb_2O_5$ | 28.7 | 37.0 | 38.7 | 43.0 | 29.2 |
| $WO_3$ | — | 12.0 | 11.2 | — | — |
| $Bi_2O_3$ | 34.6 | 10.0 | 11.2 | 17.0 | 34.3 |
| | | | ZnO 2.2 | | SrO 1.8 |
| Characteristic Values | | | | | |
| nd | 1.83816 | 1.86320 | 1.84170 | 1.88046 | 1.86251 |
| νd | 23.1 | 23.1 | 23.3 | 22.7 | 23.6 |
| At/° C. | 512 | 534 | 516 | 520 | 474 |

| Composition | Example No. | | | | |
|---|---|---|---|---|---|
| | 11 | 12 | 13 | 14 | 15 |
| $P_2O_5$ | 15.1 | 14.5 | 20.0 | 23.0 | 25.1 |
| $B_2O_3$ | 1.2 | 4.5 | 1.0 | — | 1.2 |
| $GeO_2$ | 6.9 | — | — | — | — |
| $Li_2O$ | 6.0 | 3.0 | 1.0 | 3.0 | 3.4 |
| $Na_2O$ | 3.0 | 3.0 | 11.0 | 8.0 | 5.4 |
| BaO | 2.0 | 22.0 | 7.0 | 6.0 | — |
| $Nb_2O_5$ | 26.8 | 31.0 | 40.0 | 38.0 | 28.5 |
| $WO_3$ | 28.0 | 7.0 | 10.0 | 12.0 | — |
| $Bi_2O_3$ | 11.0 | 15.0 | 10.0 | 10.0 | 35.1 |

TABLE 1-continued (wt %)

| | | | | | MgO 1.3 |
|---|---|---|---|---|---|
| Characteristic Values | | | | | |
| nd | 1.87260 | 1.85727 | 1.85271 | 1.84736 | 1.85947 |
| νd | 23.3 | 23.0 | 23.1 | 23.6 | 23.7 |
| At/° C. | 474 | 547 | 543 | 525 | 476 |

COMPARATIVE EXAMPLES 1 to 5

Glasses of Comparative Examples 1 to 5 correspond to those of Examples 7 to 11, as the second embodiment of the invention described in JP-A-8-157231. In Table 2 are shown the refractive index (nd), Abbe number (νd), yield temperature (At) (which the inventors have really measured) and coloration (which refers to wavelengths exhibiting transmittance of 70% and 5%, represented as a unit of 10 nm through rounding at a decimal place) of these glasses. The measurement method and indication method of the coloration are according to Measurement Method of Coloration of Optical Glass in Japanese Optical Glass Industrial Standards (JOGIS 02-1975).

Generally, the higher is the refractive index of the glass, the larger is the reflectivity for light, so that the glass is seen colored in yellow with the naked eye. When $TiO_2$ is incorporated as a glass component, furthermore, sharp absorption appears in the short wavelength zone and consequently, the resulting glass is further strongly colored. Since all the glasses of Comparative Examples 1 to 5 contain $TiO_2$, as shown in Table 2, the coloration thereof all exhibit larger values than those of Example 9 in which highest refractive index, highest dispersion and strongest coloration were given. As exemplified in FIG. 1, the coloration of Example 9 according to the present invention and Comparative Example 3 are respectively 42/37 and 50/38 and the glass of Comparative Example 3 is not preferable as an optical glass for use, because of being more strongly colored than that of Example 9.

Furthermore, it is well known that when $TiO_2$ is incorporated in a glass composition, high refractive index, high dispersion properties of the glass composition can readily be obtained. However, the glass containing $TiO_2$ tends to exhibit a high yield temperature (At) as apparent from the data of Comparative Examples showing higher yield temperatures (At) than those of Examples of the present invention. In particular, the glass of Comparative Example 5, having the similar high refractive index, high dispersion properties to those of the present invention as claimed, exhibited a very high yield temperature, i.e. 595° C. This can be considered due to that in the composition system of Comparative Examples 1 to 5 ($P_2O_5$—$B_2O_3$—$Nb_2O_5$—$WO_3$-alkali metal oxides system), it is difficult to incorporate $GeO_2$ considered very effective for increasing the refractive index therein so as to readily obtain high refractive index, high dispersion properties and accordingly, there is no way but adding $TiO_2$ in addition to the essential components. JP-A-8-157231 discloses that in the composition system of $P_2O_5$—$B_2O_3$—$Nb_2O_5$—$WO_3$-alkali metal oxide, it is difficult to maintain the high refractive index, high dispersion properties so long as $TiO_2$ is not added. In the glass of $P_2O_5$—$Nb_2O_5$—$Bi_2O_3$—$Na_2O$ system the present invention proposes, however, $GeO_2$ can be incorporated while maintaining the low softening property and it is rendered easy to achieve a high refractive index.

Based on the above described reasons, any of the glasses of Comparative Examples 1 to 5 cannot be put to practical use.

| Composi- | Example | Comparative Example No. | | | | |
|---|---|---|---|---|---|---|
| tion | 9 | 1 | 2 | 3 | 4 | 5 |
| $P_2O_5$ | 17.0 | 18.4 | 23.9 | 23.4 | 23.8 | 27.8 |
| $B_2O_3$ | 4.0 | 12.5 | 5.6 | 5.6 | 2.6 | 2.6 |
| $SiO_2$ | — | 2.0 | — | 3.0 | — | — |
| $GeO_2$ | 7.0 | — | — | — | — | — |
| $Li_2O$ | 3.0 | 1.5 | 1.0 | 1.0 | 3.0 | 2.0 |
| $Na_2O$ | 7.0 | 10.3 | 9.5 | 9.5 | 5.7 | 6.7 |
| $K_2O$ | — | — | 7.0 | 7.0 | 1.5 | 2.5 |
| $TiO_2$ | — | 5.0 | 9.2 | 9.2 | 3.6 | 8.6 |
| $Nb_2O_5$ | 43.0 | 37.7 | 33.8 | 36.8 | 38.3 | 39.8 |
| $WO_3$ | — | 8.6 | 7.0 | 3.0 | 9.0 | 5.0 |
| BaO | 2.0 | 0.2 | — | — | 12.3 | 5.0 |
| | $Bi_2O_3$ 17.0 | | SrO 3.0 | Mg 1.5 | $As_2O_3$ 0.2 | |
| Characteristic Values | | | | | | |
| nd | 1.88046 | 1.77071 | 1.77945 | 1.77486 | 1.82818 | 1.83852 |
| vd | 22.7 | 24.4 | 26.3 | 24.1 | 24.3 | 21.1 |
| At/° C. | 520 | 558 | 549 | 564 | 555 | 595 |
| Coloration | 42/37 | 49/38 | 47/38 | 50/38 | 43/38 | 49/38 |

ADVANTAGES OF INVENTION

According to the present invention, the glass, the inventors have already proposed in JP-A-10-316448, are largely improved to lower the softening point thereof like lead oxide, tellurium oxide, etc. and on the other hand, there can be provided a high refractive index, high dispersion optical glass for precision molding, containing no harmful components to the ambient environment and health and having excellent properties, i.e. yield temperature (At) of at most 550° C., refractive index (nd) of at least 1.83 and Abbe number (vd) of at most 26.0 and further providing a low softening property as well as an improved mass production property with less coloration.

What is claimed is:

1. A high refractive index, high dispersion optical glass or precision molding, having a yield temperature (At) of at most 550° C., refractive index (nd) of at least 1.83 and Abbe number (vd) of at most 26.0, which is represented, in term of atoms for making up the glass, by the following chemical composition (wt %):

| | |
|---|---|
| $P_2O_5$ | 14.0 to 31.0% |
| $B_2O_3$ | 0 to 5.0% |
| $GeO_2$ | 0 to 14.0% |
| Sum of $P_2O_5 + B_2O_3 + GeO_2$ | 14.0 to 35.0% |
| $Li_2O$ | 0 to 6.0% |
| $Na_2O$ | 2.5 to 14.0% |
| Sum of $Li_2O + Na_2O$ | 2.5 to 15.0% |
| $Nb_2O_5$ | 25.0 to 50.0% |
| $WO_3$ | 0 to 30.0% |
| $Bi_2O_3$ | 5.0 to 36.0% |
| BaO | 0 to 22.0%. |

2. A high refractive index, high dispersion optical glass for precision molding, having a yield temperature (At) of at most 550° C., refractive index (nd) of at least 1.83 and Abbe number (vd) of at most 26.0, which is represented, in term of atoms for making up the glass, by the following chemical composition (wt %):

| | |
|---|---|
| $P_2O_5$ | 15.0 to 30.0% |
| $B_2O_3$ | 0 to 4.0% |
| $GeO_2$ | 0 to 12.0% |
| Sum of $P_2O_5 + B_2O_3 + GeO_2$ | 17.0 to 30.0% |
| $Li_2O$ | 0 to 5.0% |
| $Na_2O$ | 5.0 to 13.0% |
| Sum of $Li_2O + Na_2O$ | 5.0 to 14.0% |
| $Nb_2O_5$ | 25.0 to 45.0% |
| $WO_3$ | 0 to 20.0% |
| $Bi_2O_3$ | 6.0 to 30.0% |
| BaO | 0 to 15.0%. |

\* \* \* \* \*